Oct. 14, 1958 R. MILLER 2,856,353
REMOVAL OF MERCAPTANS WITH ALKALI FERROCYANIDE SOLUTIONS
FOLLOWED BY REGENERATION OF THE ALKALINE SOLUTION
BY ELECTROLYTIC OXIDATION
Filed Jan. 31, 1955 2 Sheets-Sheet 1
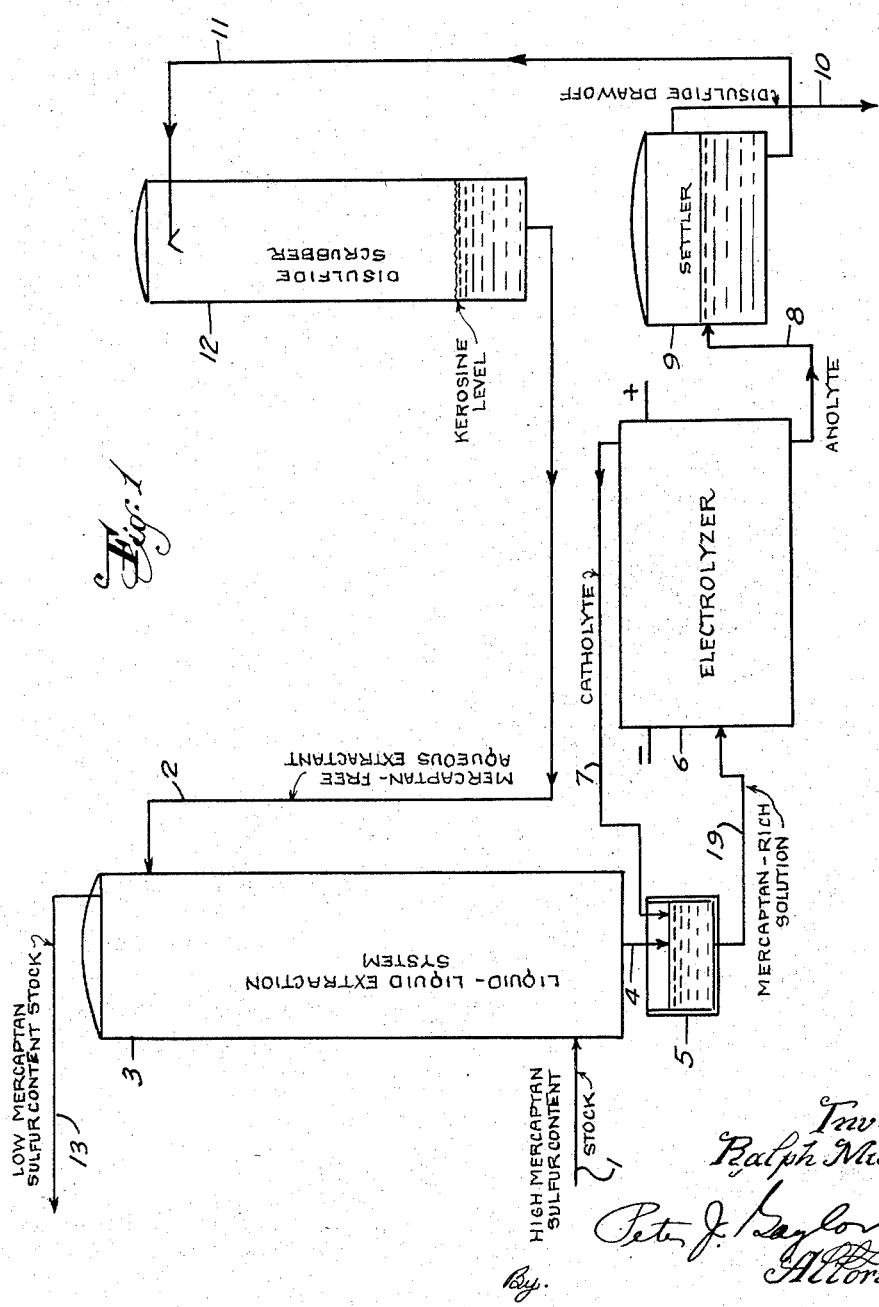

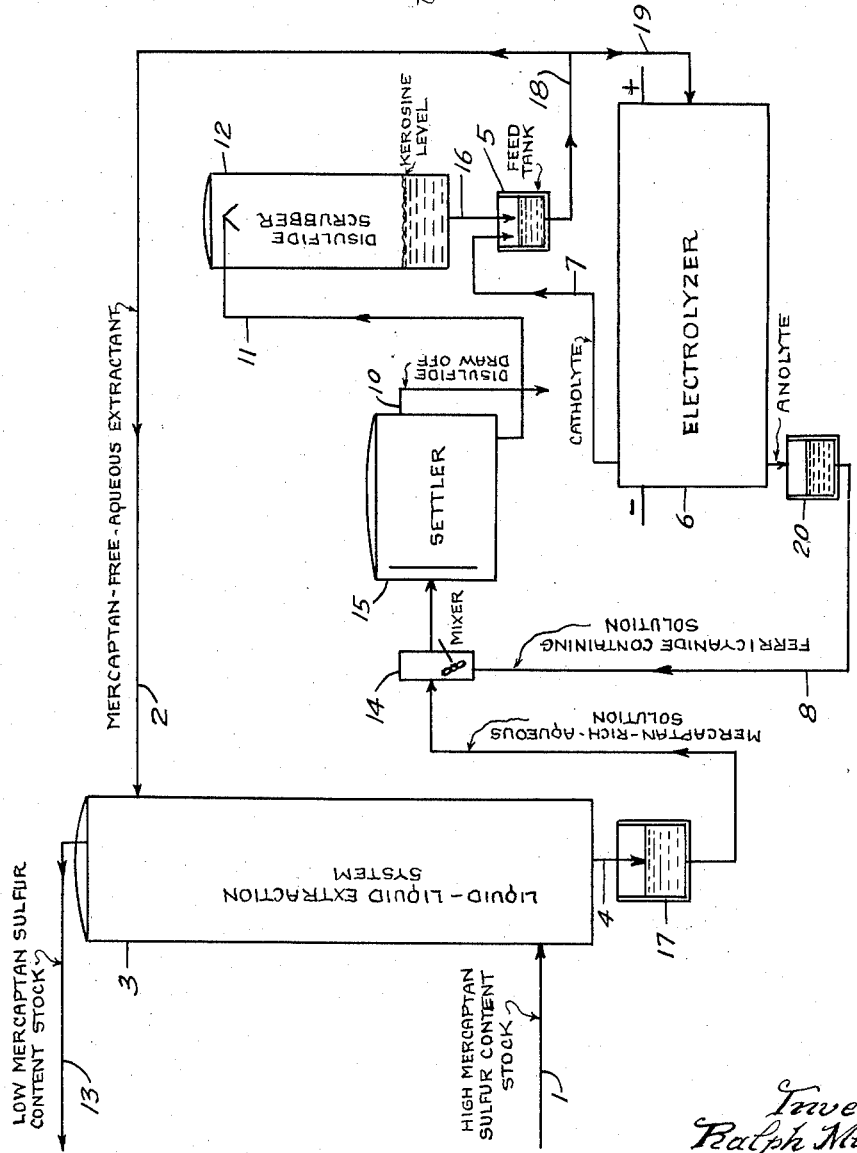

United States Patent Office 2,856,353
Patented Oct. 14, 1958

2,856,353

REMOVAL OF MERCAPTANS WITH ALKALI FERROCYANIDE SOLUTIONS FOLLOWED BY REGENERATION OF THE ALKALINE SOLUTION BY ELECTROLYTIC OXIDATION

Ralph Miller, Pleasantville, N. Y., assignor to American Development Corporation, Elizabeth, N. J., a corporation of New Jersey Application January 31, 1955, Serial No. 485,200

4 Claims. (Cl. 208—235)

This invention is concerned with the treating of water-immiscible fluids and, more particularly, with the extraction of acidic sulfur compounds, such as mercaptans, from such fluids.

Acidic sulfur compounds, such as mercaptans, are soluble in aqueous alkaline solutions to a greater or less degree, so that when an aqueous alkaline solution is contacted with a mercaptan-containing water immiscible fluid, a portion of the mercaptans initially contained in the water-immiscible fluid passes or dissolves into the aqueous phase. The fraction which transfers from the water-immiscible fluid to the aqueous phase depends upon a variety of factors, including the temperature, the molecular weight and configuration of the mercaptan, the composition of the aqueous phase, the ratio of the volume of the aqueous phase to the volume of the water-immiscible fluid, and the like. In general, the mercaptan sulfur concentration of most water-immiscible fluids, be they liquid or gaseous, is relatively small. The ratio of the mercaptan sulfur concentration of the aqueous phase in equilibrium with the mercaptan sulfur concentration of the water-immiscible fluid is not so large as to make it economically feasible to discard the spent alkaline solution. As a result, it is necessary to process the mercaptan-rich aqueous alkaline solution to reduce its mercaptan sulfur concentration and thereby restore its ability to extract additional quantities of mercaptans from the mercaptan-containing source material.

The removal of mercaptans from hydrocarbons is of particular economic importance, since the petroleum industry finds it necessary to market products which are substantially free from mercaptans. In addition, there are numerous instances in which it is advantageous to remove mercaptans from hydrocarbon streams which are to be subjected to additional operations. Since sulfur is antagonistic to the anti-knock activity of tetraethyl lead (TEL), the removal of sulfur compounds from fuels to which TEL is to be added, minimizes the quantity of TEL required to attain the desired octane rating. As a result of the importance of diminishing the mercaptan sulfur concentration of hydrocarbon streams, aqueous solutions of various compositions have been suggested and employed to remove mercaptans from hydrocarbons.

Only two different methods have been employed commercially to any great extent to regenerate spent aqueous solutions, so that their ability to extract additional mercaptans is restored. These methods consist of either vaporizing the mercaptans or converting the mercaptans to a disulfide or some other sulfur-containing compound which is but slightly soluble in water. One method in the latter category consists of subjecting the mercaptan-containing aqueous solution to so called nascent oxygen formed by circulating the mercaptan-containing solution through the anode compartment of a diaphragm-equipped electrolytic cell, and passing a current through the cell while continuing the circulation. This process is described in detail in the Gaylor U. S. Patent 2,654,706. Additional experimental work and large scale commercial use of this latter process has revealed that the current efficiency depends upon the mercaptan sulfur concentration of the alkaline solution. As the mercaptan sulfur concentration of the alkaline solution diminishes, the current efficiency decreases. For example, if the regenerated alkaline solution contains about 3 grams per liter of mercaptan sulfur, the overall current efficiency will approximate 25%. If the regenerated alkaline solution contains about 0.5 gram of mercaptan sulfur per liter, the current efficiency falls to about 10%. If the regenerated solution contains as little as about 0.1 gram per liter of mercaptan sulfur, then the current efficiency decreases to about 3%.

Clearly, if the regenerated alkaline solution contains an appreciable concentration of mercaptan sulfur, it capacity to extract mercaptans from hydrocarbon streams is diminished. In addition, the mercaptan sulfur concentration of the extracted hydrocarbon cannot be reduced below a level which is in equilibrium with the regenerated alkaline solution irrespective of the efficiency of the extraction system that is used.

The art, as a whole, has been confronted with the problem of regenerating mercaptan-containing solutions to the point where the regenerated solution is substantially free from mercaptans, and this effect must be achieved at a cost which is reasonable both with respect to the required initial investment and to operating charges involved.

It is an object of this invention to regenerate alkaline mercaptan-containing solutions to the point where the mercaptan concentration is vanishingly small, at an energy expenditure which compares favorably with all other known processes for diminishing the mercaptan concentration of mercaptan-containing alkaline solutions. A further object of this invention is to accomplish the above recited objective by means of equipment which has a moderate first cost.

This objective can be achieved according to this invention by employing an alkaline aqueous solution containing dissolved ferrocyanide to extract mercaptans, and then employing the reversible system ferrocyanide-ferricyanide to aid in the conversion of the dissolved mercaptides to disulfides or sulfur compounds which are appreciably more soluble in hydrocarbons than in alkaline aqueous solution. The electrochemical conversion of ferrocyanide to ferricyanide is either actually accomplished or would be accomplished if other reactions did not intervene. The invention may be employed in a variety of ways. One method of carrying out the invention is as follows:

A hydrocarbon stream containing dissolved mercaptans is contacted with an aqueous solution containing about 12% sodium hydroxide and 4% of dissolved sodium ferrocyanide so that the aqueous solution contains 1 gram per liter of mercaptan sulfur. An aqueous alkaline solution of this composition has been found to extract mercaptans from hydrocarbon solutions nearly as well as a 12% sodium hydroxide solution free from ferrocyanide. This separated aqueous mercaptan-containing solution is placed in the anode compartment of an electrolytic cell equipped with a porous inert diaphragm (such as a ceramic diaphragm), a Nichrome gauze anode, and a magnetic stirrer in the anode compartment. After 500 milliliters of the solution is placed in the anode compartment the magnetic stirrer is started and a current of 2 amperes permitted to flow through the cell. At the end of 16 minutes the solution is mercaptan-free. That is, the solution is completely regenerated at a current efficiency of about 80%.

Another method of demonstrating similar results is as follows: An electrolytic cell is set up in which the anode is made of porous stainless steel arranged so solution can be drawn through it. To an aqueous solution containing 12% NaOH and 38 g./l. of $K_4FE(CN)_6$ (ferrocyanide) sufficient normal butyl mercaptan is added to form a solution which is .03 N with respect to mercaptan sulfur. About 600 ml. of this solution is passed through the anode electrode. About 9 minutes are required for the 600 ml. of solution to flow through the electrode. While the solution is flowing through the electrode, a current of 5 amperes is passed through the cell. The anolyte solution, on analysis, is found to be .003 N with respect to mercaptan sulfur. In this simple manner, 90% of the mercaptans in the original solution are converted to disulfides at a current efficiency of 60%. The original solution contained 0.96 g./l. of mercaptan sulfur. The oxidized solution .096 g./l. of mercaptan sulfur.

When the anolyte solution is recycled to the cell for another pass, the anolyte leaving the cell has a deep yellow color, showing the presence of ferricyanide by visual observation. A qualitative chemical test confirms the visual evidence.

It is possible, according to the present invention, to regenerate mercaptan-containing solutions by employing alkaline solutions containing dissolved ferricyanide. For example, one liter of an aqueous alkaline solution containing 0.75 g./l. or 0.0238 equivalent of mercaptan sulfur is mixed with an equal volume of solution containing 0.03 equivalent of ferricyanide. Upon analysis, it is found that the resulting solution is free from mercaptans and has a trace of ferricyanide present. This demonstrates that about one equivalent of ferricyanide is consumed for each equivalent of mercaptan sulfur that disappears. The solution containing the 0.03 equivalent of ferricyanide is prepared by passing an alkaline solution containing 12% sodium hydroxide and 35 g./l. of $Na_4Fe(CN)_6$ through an anode gauze electrode at such a rate that the effluent solution is 0.03 N in ferricyanide. It is found that a current efficiency of 65% is secured when the current density is about 120 amperes per square foot.

In carrying out a cyclic process using this method of operation, the resulting aqueous solution is settled and then washed with a hydrocarbon, such as kerosene, to remove substantially all of the disulfides that are formed. The solution then is divided into two portions. One portion is recycled to the mercaptan extraction step, the other is recycled to the ferricyanide formation operation. In this way, it is possible to electro-chemically completely regenerate a mercaptan-containing alkaline solution at a relatively high current efficiency. At the same time, the mercaptans need not enter the electrolytic equipment.

In the discussion above, a 12% sodium hydroxide solution has been used to illustrate the type of aqueous alkaline solution which may be employed in a process of this nature. The concentration of sodium hydroxide can be varied over a wide range without affecting the operability of the process. In some instances, it may be found useful to employ more concentrated solution, e. g. if the solution is to be subjected to sub-freezing temperatures. Less concentrated solutions, e. g. 8% NaOH also will work well, although such solutions possess somewhat lower conductivities than the more concentrated solutions. Solutions containing relatively high concentrations of ferrocyanide are less suitable extractants than the alkaline solutions containing lesser concentrations of ferrocyanide. Solutions with higher ferrocyanide concentrations permit higher current efficiencies to be achieved than solutions of lesser concentration. The solubility of ferrocyanides in alkaline solutions depends upon the concentration of free alkali and the temperature. In general, extraction of mercaptans is enhanced at the lower temperature so that it is preferable to carry out the extraction step at as low a temperature as possible. Ferrocyanides have relatively high temperature-solubility coefficients. At low temperatures, it is not possible to prepare appreciably concentrated solutions. This fact, coupled with the salting-out effect of free alkali, makes it undesirable to attempt to use ferrocyanide solutions of concentration greater than about 0.2 N and, in general, solutions containing about 0.1 N ferrocyanide are preferred.

It will be seen from the foregoing that, for the first time, it is possible to completely regenerate a mercaptan-containing alkaline solution within commercial time limits, and that this complete regeneration is accomplished quickly, simply and with an efficiency that does not decrease appreciably as the mercaptan concentration reaches the vanishing point.

Although the invention has been described in terms of sodium hydroxide, it has been found that other alkali metal hydroxides, such as potassium hydroxide, work at least as well. In fact, due to the greater solubility of potassium hydroxide and potassium ferrocyanide, the potassium compounds may be preferable to the sodium compounds in some instances. Mixtures of the sodium and potassium compounds are also effective. Everything else being equal, the sodium compounds are preferred because they are less expensive.

Two methods have been described above for carrying out the regeneration of mercaptan-containing alkaline solutions. In one case, the mercaptan-containing solution is passed through the anode compartment of an electrolytic cell. When this method is employed, the rate at which the solution is passed through the cell and the amount of current supplied to the cell are regulated so that only a trace of mercaptan or a trace of ferricyanide is present in the anolyte effluent. The cell should be so constructed and operated that the solution which enters the anolyte compartment or contacts the anode avoids contact with either the cathode or with the hydrogen formed at the cathode. This may be accomplished by separating the anode and cathode compartments by means of a diaphragm or by flowing the solution past or through the respective electrodes so that the undesirable contacting is avoided. The other general method employed consists of forming a ferricyanide containing solution in an electrolytic cell and then using the ferricyanide so formed to convert mercaptan to disulfides. Both methods possess advantages and disadvantages. The method of choice will depend upon the circumstances surrounding any given situation.

The ferricyanide employed herein is a water-soluble ferricyanide which, on reaction with mercaptan, is converted to the ferrocyanide. The alkali metal ferrocyanides are preferred.

The particular type of electrolytic cell used to convert dissolved mercaptides to disulfides or dissolved ferrocyanide to ferricyanide is not of critical importance. One type of cell which has been successfully used is similar in structure to that depicted in the aforementioned Patent 2,654,706, and consisting of two stainless steel elctrodes placed in an insulating framework and divided by a diaphragm which is permeable to ions but which substantially prevents the electrolytic products formed at one electrode from contacting the other electrode. Provision is made to circulate solution through the cell compartments on either side of the diaphragm and to vary the flow through one cell compartment without materially affecting the flow through the cell compartment on the other side of the diaphragm. The ports through which the solution leaves the cell compartments are made sufficiently large to accommodate the gas formed as a result of the electrolysis.

An electrolyzer of this type can be used to either convert mercaptans to disulfides in the presence of dissolved ferrocyanide with high current efficiency even though the mercaptan concentration reaches the vanishing point, or it can be used to convert ferrocyanide to ferricyanide. In general, the concentration of ferricyanide formed is not materially in excess of 20% of the ferrocyanide concentration of the incoming feed solution. Conversions in this range are employed solely to make it easy to obtain high current efficiencies. It is easily possible to convert any desired percentage of the initial ferrocyanide to ferricyanide but, as the percentage conversion is increased, the current efficiency diminishes. Since the dissolved mercaptides react rapidly with dissolved ferricyanide, little is gained by achieving a relatively high conversion of the ferrocyanide which is circulated through the anode side of the cell. Rapid circulation with reasonable conversions makes it a simple matter to secure high current efficiencies at high current densities. It is easily possible to employ current densities in excess of 100 amperes per square foot and to obtain current efficiencies of at least 80%. Even higher efficiencies at higher current densities are achieved when mercaptans are present in the anolyte feed.

Another type of cell which has also been used successfully consists of two parallel closely woven wire gauze electrodes spaced about ½ inch apart, held in an insulated framework with the surface of the gauze in the vertical plane. Provision is made to feed the spent solution into the space between the two gauze electrodes. The solution flows through the gauze electrodes, thus insuring intimate contact of the solution with the electrode and eliminating the diaphragm. This arrangement makes it possible to secure very high current efficiencies at low voltages. There are definite lower limits to the rate of solution circulation below which it is inadvisable to operate. An electrolyzer of this type is somewhat more expensive to construct than the type described previously. However, the high current efficiencies obtainable therewith at low voltages makes its use advisable under conditions where power costs tend to be high. Its relatively higher cost is offset to some extent by the saving in required rectifier capacity, since it makes possible a higher power efficiency.

Since alkaline ferricyanide solutions are decomposable by active iron (i. e. iron in the form of natural iron or steel, etc., but not as an inactive alloy, such as Nichrome, 18–8 stainless steel, etc.) it is desirable that contacting of such solutions be done in vessels substantially free from active iron. It is possible however, by certain techniques, to employ iron vessels with relative impunity. For example, it is possible to feed the alkaline ferricyanide solution into the center of an iron vessel containing the mercaptan-containing solution and carry out the mixing and reaction so that the iron walls of the vessel have very little deleterious effect. However, it is preferable to handle such solutions in vessels of inert material such as stainless steel, plastic, glass, Monel metal, rubber, concrete, or the like. The electrolyzer plates may be made of such material as vermiculite cement or perlite cement, preferably latex-impregnated to avoid solution-seepage, wherein the conductive portion of the plate may be an insert of stainless steel, or the like.

It also has been observed that acid oils (cresols) tend to react with alkaline ferricyanide and oils or alkaline solutions containing substantial amounts of such compounds should be avoided. Hydrogen sulfide or alkali sulfides also react with alkaline ferricyanides to form free sulfur which may be deleterious in some operations wherein the free sulfur finds its way into solution in the hydrocarbon being treated. In such cases, this compound also should be avoided by a prior extraction step or similar operation.

The process of this invention can be carried out in two general ways. One method is shown in Figure 1. The mercaptan-containing stock fed in through pipe 1 is contacted with the aqueous alkaline solution containing about 0.1 mol per liter of ferrocyanide entering through line 2 into liquid extraction system. The extractor may be of any convenient type, such as a packed tower 3, a series of mixer-settlers, or the like. The aqueous solution leaving the extraction system through pipe 4 flows to a surge drum 5 from which it is fed through line 19 to an electrolyzer 6. In the electrolyzer, the dissolved mercaptides are converted substantially completely to disulfides. The catholyte effluent from the electrolyzer discharged through line 7 is recycled to the electrolyzer feed tank or surge drum 5. The anolyte effluent flows through line 8 into a settler 9 permitting the disulfides formed in the electrolyzer to largely separate from the aqueous solution from which they originated. The disulfides (formed by the oxidation of the mercaptides) that separate are drawn off from the settler periodically through pipe 10. The aqueous solution then is drawn through pipe 11 and is scrubbed in scrubber 12 with kerosene or any other convenient solvent to remove the maximum quantity of disulfides from the aqueous solution prior to its return to the liquid-liquid extraction system. The regenerated solution, substantially free from mercaptans, then is returned to the mercaptan extraction step via line 2. Since the regenerated solution can be made absolutely free from mercaptans, the extent to which mercaptans are removed from the stock depends on the ratio of volume of caustic-ferrocyanide solution circulated to volume of stock treated, and upon the efficiency of the extraction system. Because the regenerated solution is mercaptan free, it is actually economically feasible to extract mercaptan-containing stocks to the point where they are doctor sweet and they are drawn off the top of tower 3 through line 13.

The other general method by which this invention can be carried out is depicted in Figure 2. It will be seen that a mercaptan-free aqueous extractant is fed to the liquid-liquid extraction system through line 2. The aqueous extractant is an alkali metal hydroxide solution containing about 0.1 mol per liter of ferrocyanide. As the aqueous extractant passes downwardly through the liquid-liquid extraction system in tower 3, it extracts additional quantities of mercaptans. The aqueous solution leaving the extraction system through line 4 is relatively rich in mercaptans. It flows into a surge drum 17 and from the surge drum through a mixer 14 into a settler 15. In flowing through the mixer, the mercaptan-rich solution is intensively mixed with an aqueous solution entering through pipe 8 and similar in composition to the mercaptan-rich solution, except that it is free from mercaptans and contains a relatively low concentration of ferricyanide. The flow of mercaptan-rich solution and of the ferricyanide solution is controlled so that equivalent amounts of ferricyanide and mercaptan sulfur flow into the mixer continuously. Since both solutions are aqueous, substantially complete reaction takes place in the mixer. The stream leaving the mixer 14 flows into the baffle-equipped settler 15. The disulfides formed as a result of the reaction between the dissolved mercaptides and dissolved ferricyanide are only slightly soluble in the aqueous caustic. Being less dense than the aqueous solution, they form a second liquid phase which floats on top of the caustic solution. From time to time, as sufficient disulfide accumulates, they are drawn off from the settler through line 10.

The aqueous solution flows continuously out of the settler through pipe 11 and into a disulfide scrubber 12. In the disulfide scrubber, the caustic is intimately contacted with a solvent such as kerosene. The purpose of this scrubbing operation is to remove, as far as possible, the disulfides still present in the caustic leaving the settler. The caustic leaving the disulfide scrubber through pipe 16 flows into a feed tank 5. Part of the solution leaving the feed tank returns via lines 18 and 2 to the liquid-liquid extraction system to extract additional mercaptans. The other part flows through pipe 19 into an electrolyzer anolyte so constructed and supplied with direct current that a portion of the solution leaving the electrolyzer through line 8 contains dissolved ferricyanide. This product of the electrolyzer is recycled through surge drum 20 and line 8 to the mixer 14 for additional conversion of mercaptans to disulfides. The other product of the electrolyzer is the catholyte product. It is slightly enriched in alkali hydroxide. It is recycled through pipe 7 to the feed tank.

To simplify the description and to make the invention clear, only one liquid-liquid extraction system has been shown. However, it is feasible to feed any desired number of extraction systems with mercaptan-free caustic. Thus, one system can be used to regenerate the combined spent alkali from any number of mercaptan extraction systems. This is true whether the operation is carried out as shown in either Figure 1 or Figure 2.

In copending application Serial No. 484,455 filed by Ralph Miller on January 27, 1955, there is described how an alkali hydroxide solution containing ferricyanide can be employed to sweeten hydrocarbons rather than extract the mercaptans. If the present invention is carried out as shown in Figure 2, the same regenerative system may be used in carrying out one or more sweetening treatments as well as one or more extraction processes.

It will be understood that pumps, valves and other conventional equipment have been omitted in the flowsheet and that they may be inserted wherever necessary as would be employed by those skilled in the art in carrying out the present invention.

I claim:
1. The process of removing mercaptans from a hydrocarbon fluid containing same comprising extracting said fluid with an aqueous alkaline solution containing a small amount of dissolved ferrocyanide, thereby obtaining an aqueous extract containing mercaptan, subjecting said extract to anoidic electrolysis in an electrolyzer whereby a substantial portion of the mercaptan is converted to insoluble disulfide, separating said disulfide, leaving a mercaptan-poor extract, and recycling said mercaptan-poor extract to the extraction operation.

2. The process of removing mercaptan from a hydrocarbon fluid containing same comprising extracting said fluid with an aqueous alkaline solution containing a small amount of dissolved ferrocyanide, thereby obtaining an aqueous extract containing mercaptan, mixing said extract with an electrolyzer anolyte comprising an aqueous alkaline solution containing dissolved ferricyanide in a ratio of equivalents of ferricyanide to mercaptan sulfur of about one, whereby the mercaptan in the extract is converted to insoluble disulfide and the ferricyanide is converted to ferrocyanide, separating said disulfide, leaving a mercaptan-poor extract, and recycling said mercaptan-poor extract to the extraction operation.

3. The process according to claim 2 in which a portion of the mercaptan-poor extract is electrolyzed to provide the electrolyzer anolyte.

4. The process according to claim 1 in which the alkaline solution contains about 10–20% by weight of caustic alkali and not over about 5% by weight of ferrocyanide.

References Cited in the file of this patent
UNITED STATES PATENTS

| | | |
|---|---|---|
| 289,788 | Ujhely | Dec. 4, 1883 |
| 1,888,382 | Heath | Nov. 22, 1932 |
| 2,216,856 | Short | Oct. 8, 1940 |
| 2,317,600 | Benedict | Apr. 27, 1943 |
| 2,654,706 | Gaylor | Oct. 6, 1953 |

OTHER REFERENCES

Kalichevsky et al.: "Chemical Refining of Petroleum," Reinhold Publishing Corp., N. Y. (1942), page 434, column 2.